(12) United States Patent
Ashida

(10) Patent No.: US 8,757,756 B2
(45) Date of Patent: Jun. 24, 2014

(54) REAL-TIME LINEFEED MEASUREMENT OF INKJET PRINTER

(71) Applicant: Canon Kabushiki Kaisha, Tokyo (JP)

(72) Inventor: Jumpei Ashida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/864,128

(22) Filed: Apr. 16, 2013

(65) Prior Publication Data

US 2013/0278662 A1    Oct. 24, 2013

(30) Foreign Application Priority Data

Apr. 19, 2012  (AU) ................................. 2012202319

(51) Int. Cl.
*B41J 2/045* (2006.01)
(52) U.S. Cl.
USPC .................................. 347/14; 347/16; 347/41

(58) Field of Classification Search
USPC .......................... 347/9, 12, 14, 15, 20, 40, 41
See application file for complete search history.

(56) References Cited

U.S. PATENT DOCUMENTS

| 6,714,748 | B1 * | 3/2004 | Nakayasu et al. | 399/72 |
| 6,836,344 | B2 * | 12/2004 | Koide et al. | 358/1.9 |
| 7,782,493 | B2 | 8/2010 | Asai et al. | |
| 2009/0268254 | A1 | 10/2009 | Morishita et al. | |

* cited by examiner

*Primary Examiner* — Thinh Nguyen
(74) *Attorney, Agent, or Firm* — Canon USA Inc IP Division

(57) ABSTRACT

A method of halftoning of an image comprising a pseudo-noise pattern of dots, whereby vectors between each dot and the nearest neighboring dot are orientated in a direction perpendicular to a line feed direction, and a density of the pattern of dots in a line feed direction is half of a density of the pattern of dots in a direction perpendicular to the line feed direction.

10 Claims, 23 Drawing Sheets

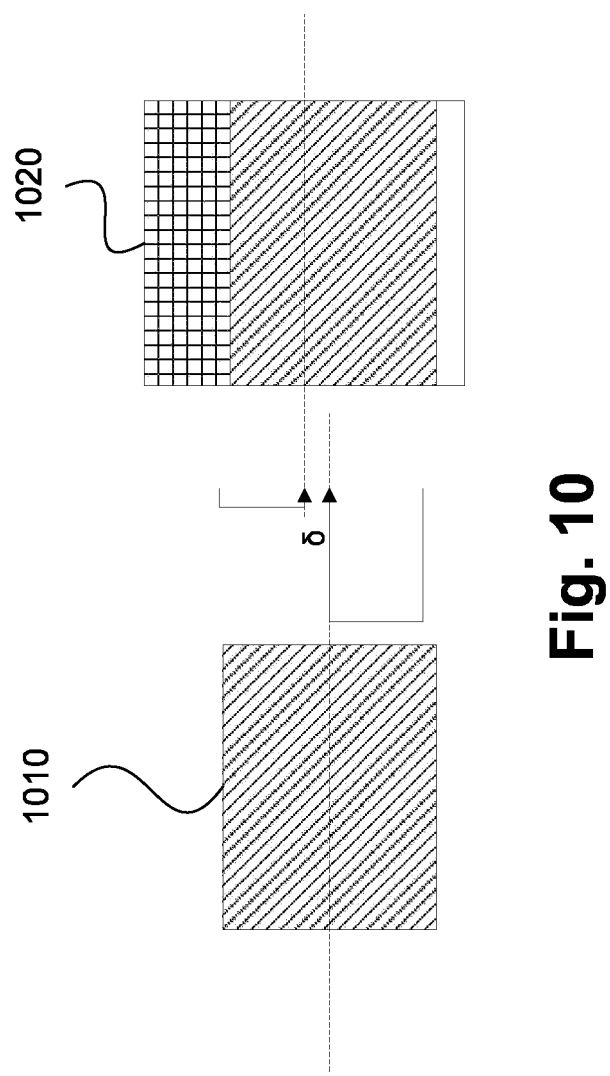

Fig. 17

Deliberately left blank

Fig. 18

Deliberately left blank

Fig. 19

Deliberately left blank

Table 1

REAL-TIME LINEFEED MEASUREMENT OF INKJET PRINTER

REFERENCE TO RELATED PATENT APPLICATION(S)

This application claims the benefit under 35 U.S.C. §119 of the filing date of Australian Patent Application No. 2012202319, filed 19 Apr. 2012, hereby incorporated by reference in its entirety as if fully set forth herein.

FIELD OF THE INVENTION

The current invention relates generally to printer calibration and, in particular, to a method of printer calibration including real time analysis of images printed by a printer in order to determine spatial characteristics of the printer.

BACKGROUND

In recent years high quality colour printers have become the norm. For ink jet printers, typical resolutions are 1200 dpi or higher, which translates into a printer ink dot size (and separation) of 20 microns or less. In many systems the ink jet printer may overprint regions multiple times to help minimise the effect of printer defects such as blocked printer head nozzles. The optical density of a printed colour can be very sensitive to the precise value of the displacement between overprinted regions. This means that, for high quality at least, it is necessary to control or calibrate the exact displacement of the printer head between overprints.

Many approaches have been proposed for calibrating the movements of the print head relative to the medium being printed upon. One approach to the calibration of print head position is the measurement of individual dot positions. Unfortunately, despite the simple experimental set-up and straightforward result analysis of this approach, it is quite unreliable due to the large variations in dot shape, position and size. There is also the difficulty of unambiguously locating isolated dots in large regions on the medium being printed upon.

More robust methods have also been suggested to accommodate the aforementioned noise and ambiguity in order to achieve accurate measurement of print head position. Some methods measure the position of a print head by printing specially designed test charts and scanning the printed image later to find the relative shift of each overprint using Fourier analysis. Although these methods are robust to noise, they involve complex computation and are not performed in real-time due to the separate printing and scanning processes that are involved.

Other methods include a method described in US 2009/0268254 wherein an optical sensor is used to measure and correct print density error. However, the printing area to be corrected needs to be covered by the field of view of the sensor. Therefore, this method can be costly and require a considerable amount of computational power. Moreover, some print defects caused by linefeed error cannot be corrected in this way.

SUMMARY

It is an object of the present invention to substantially overcome, or at least ameliorate, one or more disadvantages of existing arrangements.

Disclosed are arrangements, referred to as Pattern Oriented Relative Shift Measurement (PORSM) arrangements, that seek to address the above problems by using a print head sensor to measure, in real-time during printing, the relative shift (displacement) between a reference image to be printed and the image actually printed, where the image actually printed is printed using a multi-pass overprinting method in which a first printing pass uses oriented dot patterns having smaller dot distances in a direction perpendicular to the linefeed direction than in the orthogonal direction, in order to thereby facilitate determination of error between a nominal design line feed distance and the actual line feed distance.

According to a first aspect of the present invention, method of determining line feed error in an image forming apparatus, said image forming apparatus comprising a print head having a head sensor configured to sense information from images printed on a print medium, said method comprising the steps of:

printing a first swath of a halftone image on the print medium, said first swath having a dot pattern oriented in a direction perpendicular to a direction of linefeed of the image forming apparatus;

repositioning the print head relative to the print medium by at least one line feed distance;

determining a line feed error based upon information sensed by the head sensor from the printed first swath; and printing, using the determined line feed error, a second swath of the halftone image on the print medium, wherein said second swath:

(i) at least partially overlaps the first swath; and
(ii) has a dot pattern configured to at least partly neutralise, in an overlap area of the first swath and the second swath, the orientation of the first swath dot pattern in the halftone image.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which:

FIG. 10 illustrates the relative positions of different sections of the print head and the printed swaths;

FIGS. 17-19 have been left deliberately blank;

DETAILED DESCRIPTION

Figure 1A:
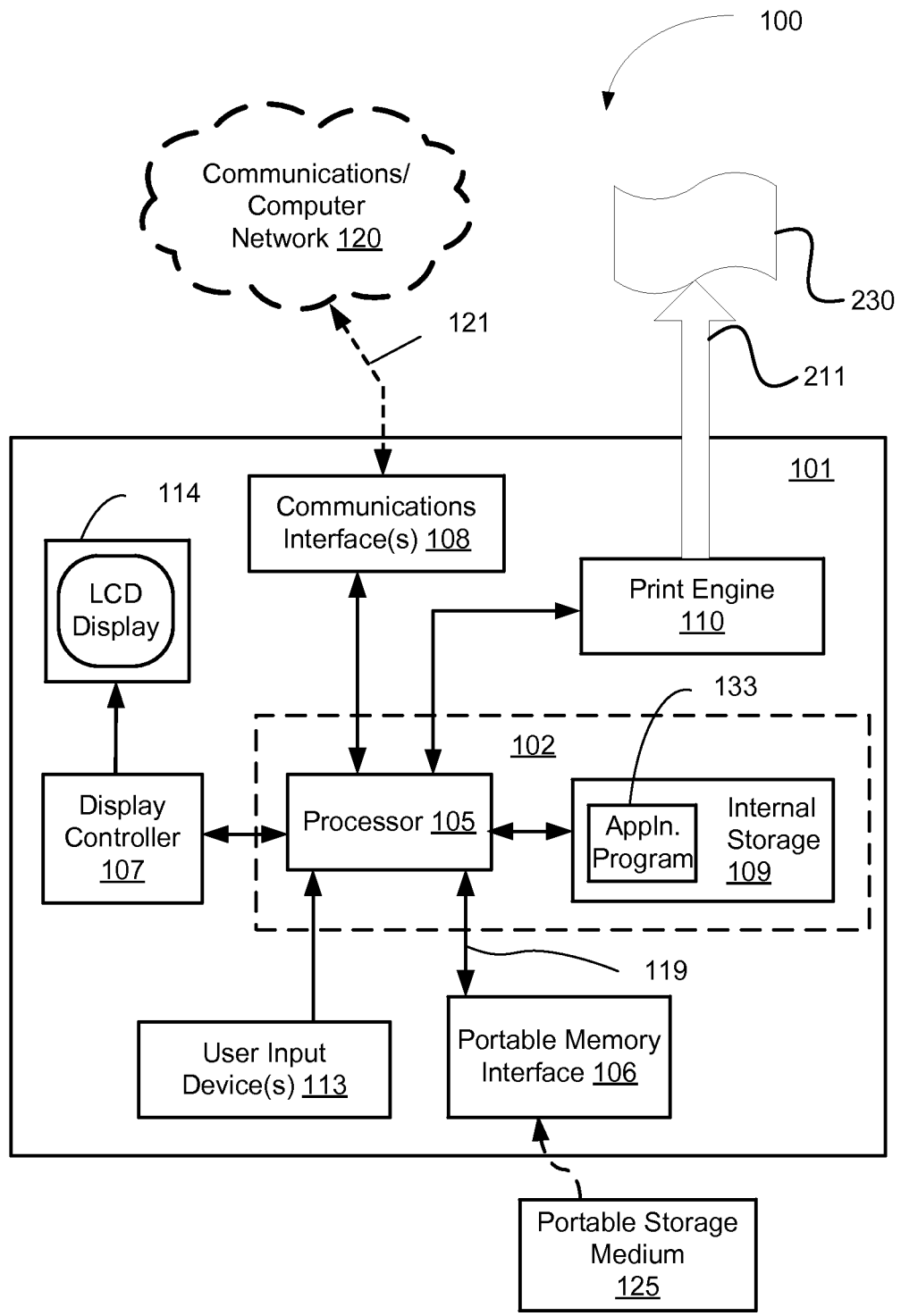
FIGS. 1A and 1B collectively form a functional block diagram representation of a printer upon which described PORSM arrangements can be practised.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

[Processing Environment]

Figure 1B:
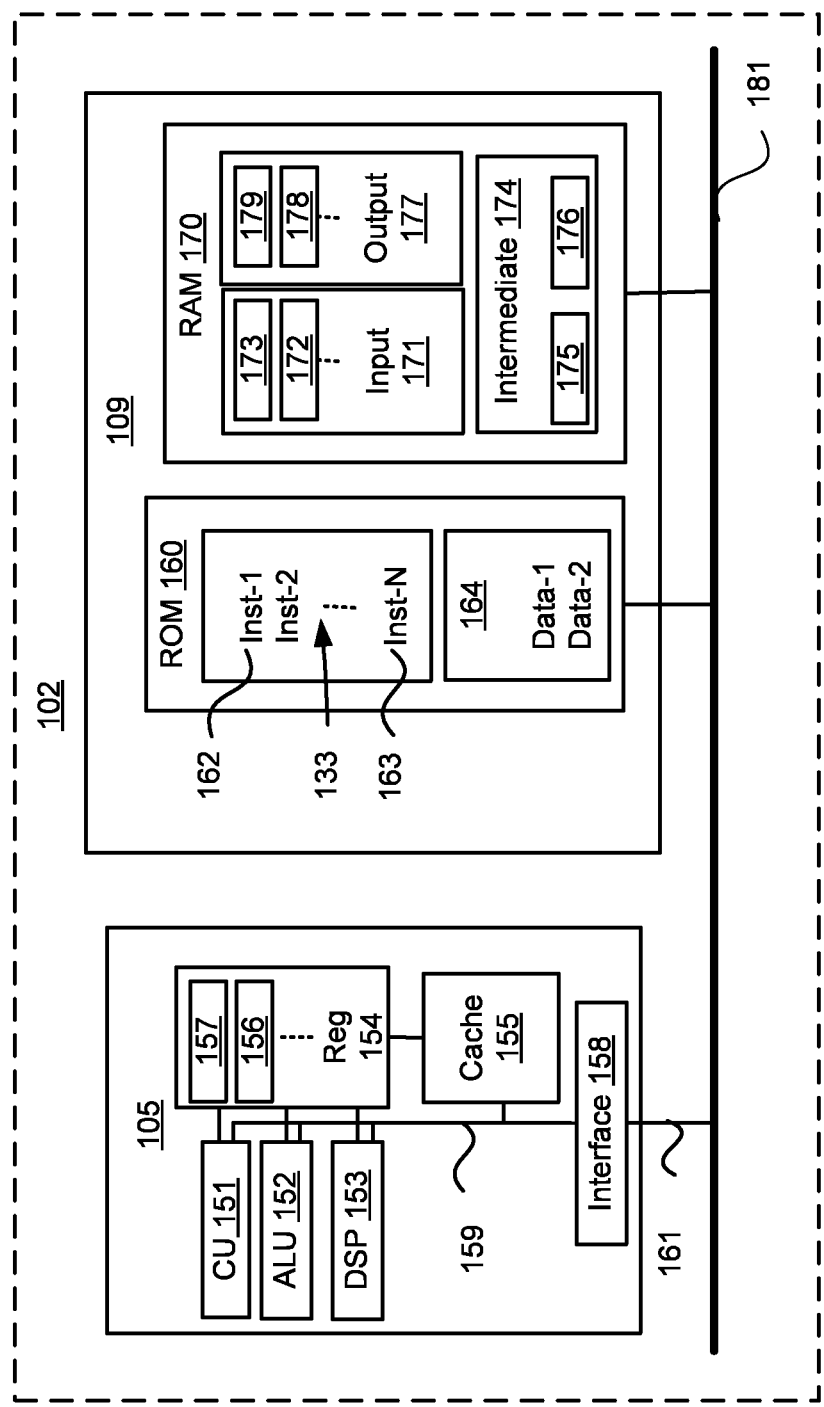

FIGS. 1A and 1B collectively form a functional block diagram representation of a printer 101 (or more generally an image forming apparatus 101) upon which described PORSM arrangements can be practised. The printer 101 incorporates a general-purpose electronic device including embedded components, upon which the PORSM methods to be described are desirably practiced.

As seen in FIG. 1A, the printer 101 comprises an embedded controller 102 which, under control of a PORSM software program 133 stored in a memory 109, controls a print engine 110 to print images according to the PORSM methods on a print medium 230 as depicted by a broad arrow 211. Accordingly, the controller 102 may be referred to as an "embedded device." In the present example, the controller 102 has a processing unit (or processor) 105 that is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The printer 101 includes a display controller 107, which is connected to an LCD display 114. The display controller 107 is configured for displaying graphical images on the LCD display 114 in accordance with instructions received from the embedded controller 102, to which the display controller 107 is connected.

The printer 101 also includes user input devices 113 that are typically formed by keys, a keypad or similar controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the printer 101 also comprises a portable memory interface 106, which is coupled to the processor 105 via a connection 119. The portable memory interface 106 allows a corresponding portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The printer 101 also has a communications interface 108 to permit coupling of the printer 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth® type local interconnection, Wi-Fi (including protocols based on the standards of the IEEE 802.11 family), Infrared Data Association (IrDa) and the like. The print engine 110 is connected to the embedded controller 102.

The methods described hereinafter may be implemented using a system 100 including the embedded controller 102, where the processes of FIGS. 4, 5, 7, 9, and 12 may be implemented as one or more PORSM software application programs 133 executable within the embedded controller 102. The printer 101 of FIG. 1A implements the described PORSM methods. In particular, with reference to FIG. 1B, the steps of the described PORSM methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The PORSM application program 133 is typically pre-installed and stored in the ROM 160 by a manufacturer, prior to distribution of the printer 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the printer 101. Examples of transitory or non-tangible computer readable transmission media that may also participate in the provision of software, application programs, instructions and/or data to the printer 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the printer 101 and the PORSM application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the printer 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the printer 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the printer 101.

The execution of a set of the instructions may require numeric variables to be read and modified. Such numeric variables are stored in the RAM 170. The disclosed PORSM method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the PORSM methods described below is associated with one or more segments of the application program 133, and is performed by repeated execution of a fetch-execute cycle in the processor 105 or similar programmatic operation of other independent processor blocks in the printer 101.

The PORSM methods may alternatively be implemented in dedicated hardware such as one or more gate arrays and/or integrated circuits performing the PORSM functions or sub functions. Such dedicated hardware may also include graphic processors, digital signal processors, or one or more microprocessors and associated memories. If gate arrays are used, the process flow charts in FIGS. 4, 5, 7, 9, and 12 are converted to Hardware Description Language (HDL) form. This HDL description is converted to a device level netlist that is used by a Place and Route (P&R) tool to produce a file which is downloaded to the gate array to program it with the design specified in the HDL description.

[Inkjet Printer and Print Head]

Figure 2:
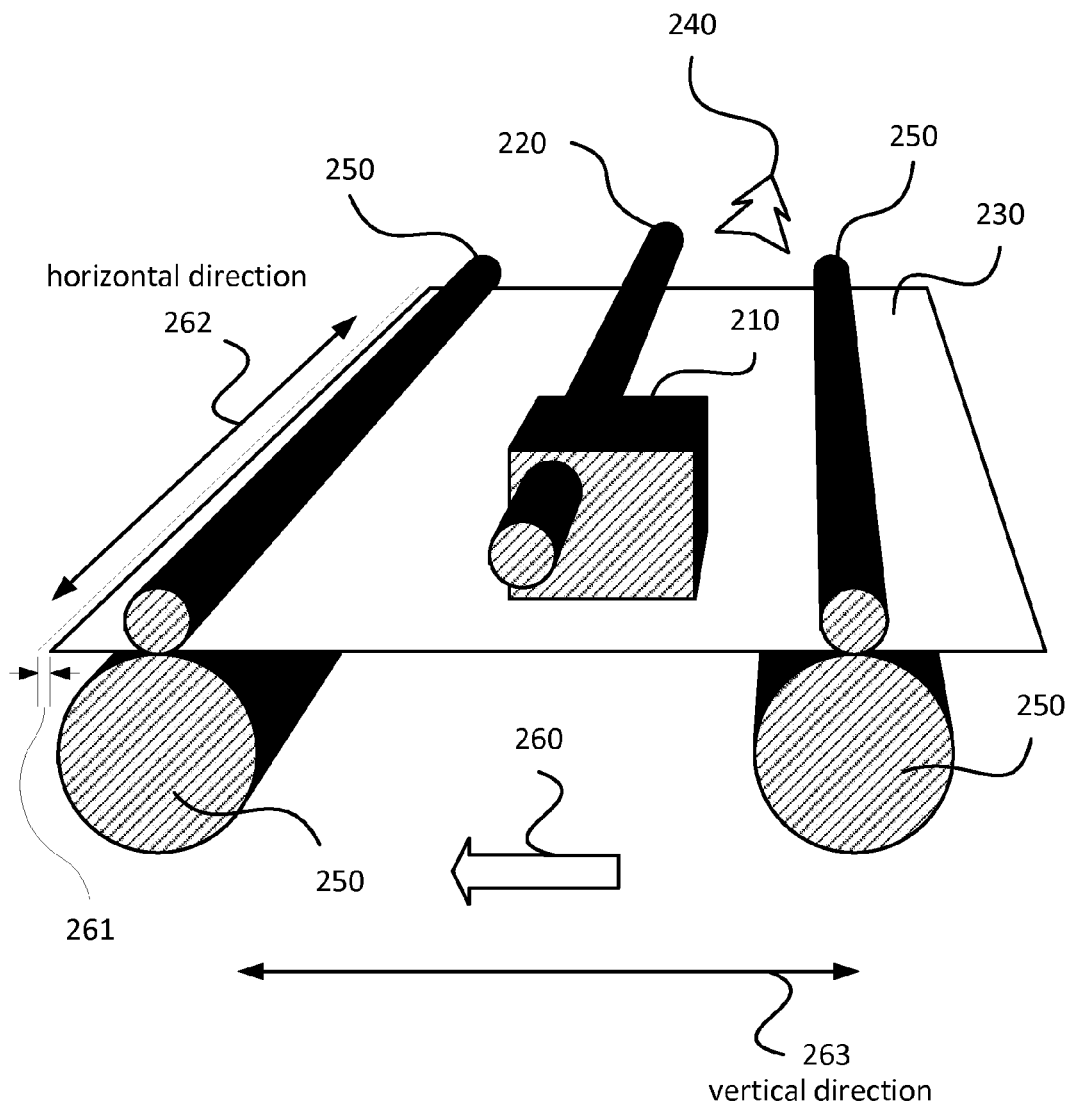
FIG. 2 illustrates a simplified representation of the mechanical layout of an inkjet printer with a moving printing head.

FIG. 2 illustrates a simplified representation of the internal arrangement of an inkjet printer. The arrangement comprises a print mechanism comprising a print head 210 having ink ejection nozzles (not illustrated) organised into banks (also referred to as groups) based on colour and/or ink volume. It will be appreciated that in some configurations, the print mechanism may incorporate more than one print head. The print head 210 is mounted on a carriage 220 which transverses a print medium 230 (which may also be referred to as a substrate) and forms image swaths during either or both of a forward passage in a scan direction 240, and a reverse passage opposite to the scan direction 240, by controlling the ejection of ink from the ink ejection nozzles within the nozzle banks. The scan direction 240 is, as depicted by an arrow 262, referred to as being in the "horizontal" direction. The inkjet printer further comprises a print medium advance mechanism 250, which transports, in discrete distance increments D, the print medium 230 in a direction 260 perpendicular to the print head scan direction 240, thereby repositioning the print head relative to the print medium. The scan direction 260 is, as depicted by an arrow 263, referred to as being in the "vertical" direction. The discrete distance increment D, depicted by a reference numeral 261, that the print medium is advanced by the print medium advance mechanism 250 is called the line feed distance. Two line feed distances are referred to in this description, namely a design line feed distance $D^d$ and an actual line feed distance LF.

[System Overview]

Figure 3:
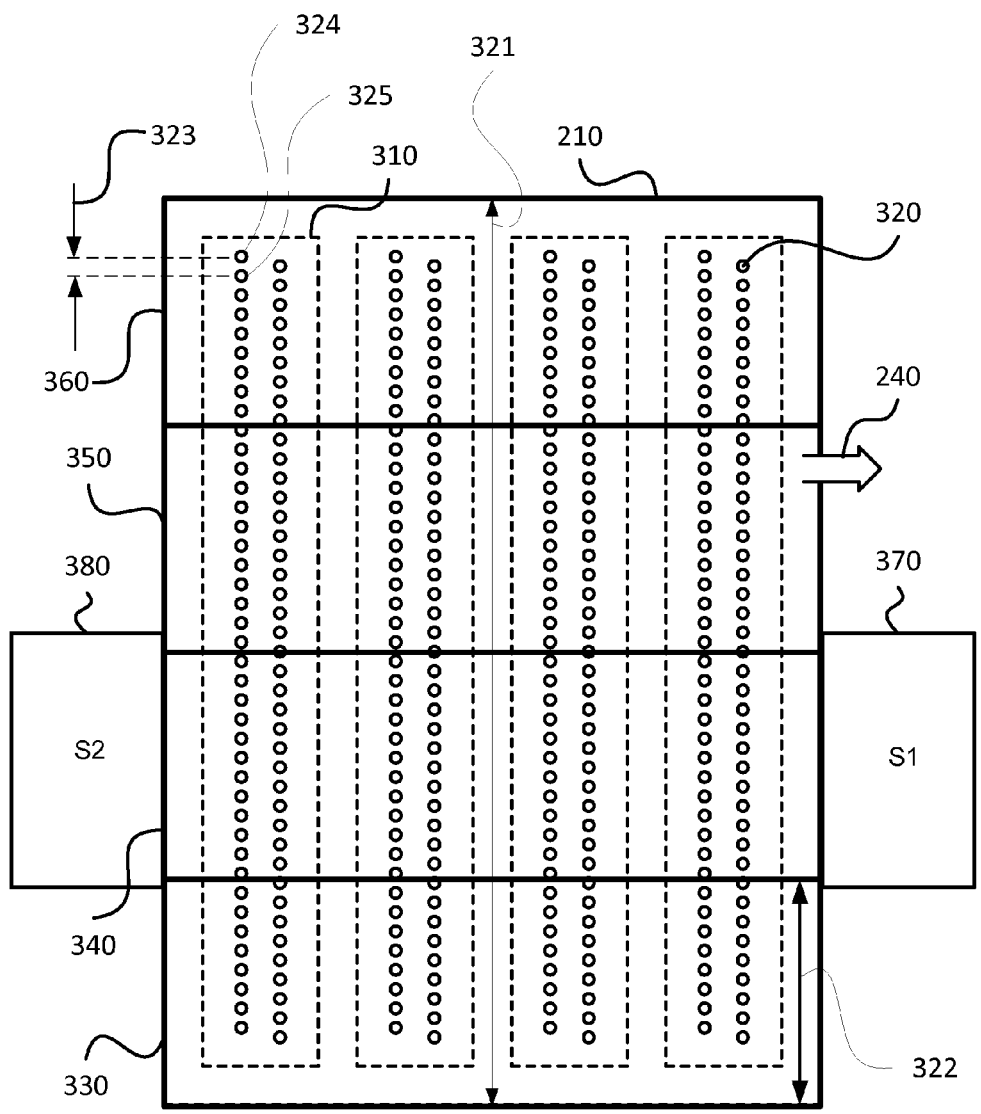
FIG. 3 illustrates a layout of an inkjet print head and the sensors.

FIG. 3 depicts a layout of ink eject nozzle banks 310 of the print head 210. Each nozzle bank 310 consists of multiple ink ejection nozzles 320. Horizontal spacing between nozzles such as nozzles 324 and 325, is depicted by a reference numeral 323. The print head 210 is, in this example, evenly divided along its length 321 into 4 sections 330, 340, 350 and 360, and a section size of each section 322 is pre-determined Consequently the section size of each section is one fourth of a full length 321 of the print head 210.

FIG. 3 also depicts two image sensors S1 and S2. They are attached to the side of the print head, as shown at 370 and 380, respectively. These two image sensors S51, S2 are capable of recording 2-D images. When the print head 210 moves in a direction 240, the sensor S1 acts as a front sensor leading the print head and the sensor S2 acts as a back sensor trailing the print head. When the print head moves in the opposite direction to 240, the sensor S1 acts as a back sensor trailing the print head and the sensor S2 acts as a front sensor leading the print head. In this example, these two sensors S1 and S2 have the same dimensions and are rectangular in shape. They are located at approximately the same "vertical" position relative to the second quarter 340.

Figure 4:
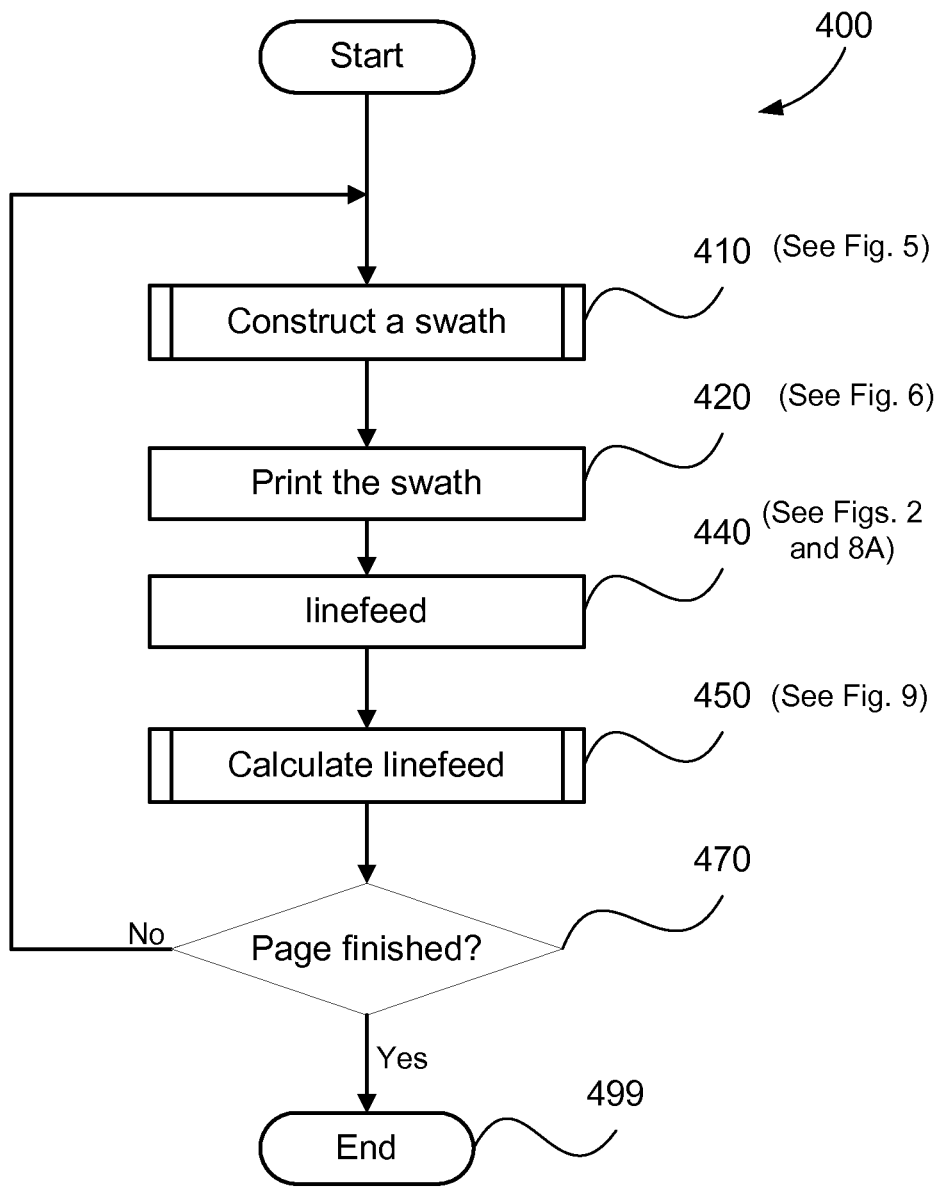
FIG. 4 shows a general flow diagram of the process of measuring and calibrating the exact displacement of the printer head between overprints in a first PORSM arrangement.

FIG. 4 depicts examples of common processes 400 of first and second PORSM arrangements. The aim of the processes 400 is to measure and calibrate the linefeed distance D of a to-be-analysed printer.

Figure 22:
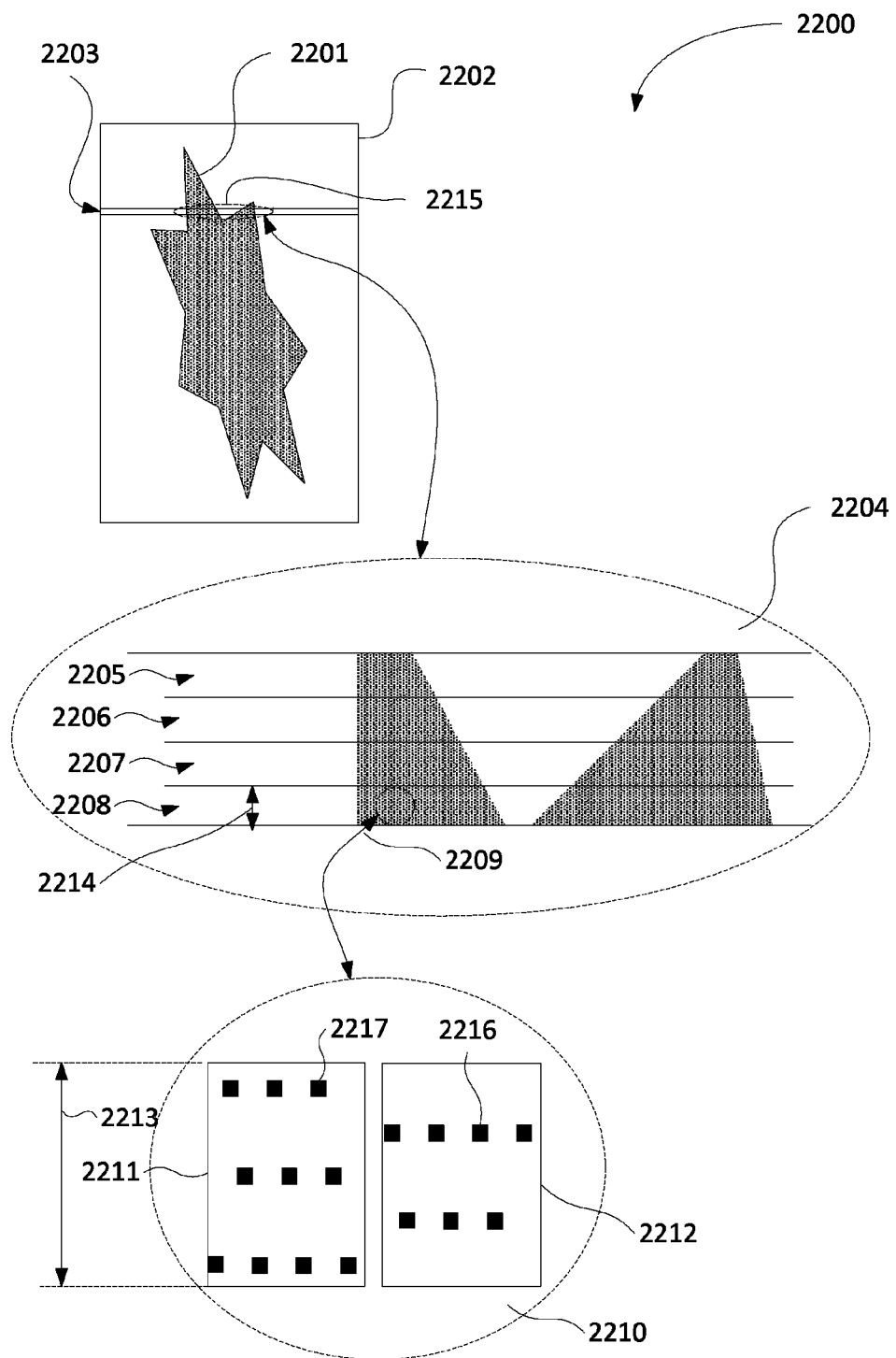
FIG. 22 illustrates the relationships between the image to be printed on a page, swaths and swath sections into which the image is decomposed, and interleaved dot patterns used to print and overprint portions of the swath sections.

The process 400 in FIG. 4 is directed, as depicted in FIG. 22, to multi-pass printing of an image 2201 on a page 2202. This is performed by decomposing the image 2201 into swaths 2203 (see 611 in FIG. 6), the height of the swath 2203 being, in the present example, determined by the height 321 of the print head 210.

Figure 6:
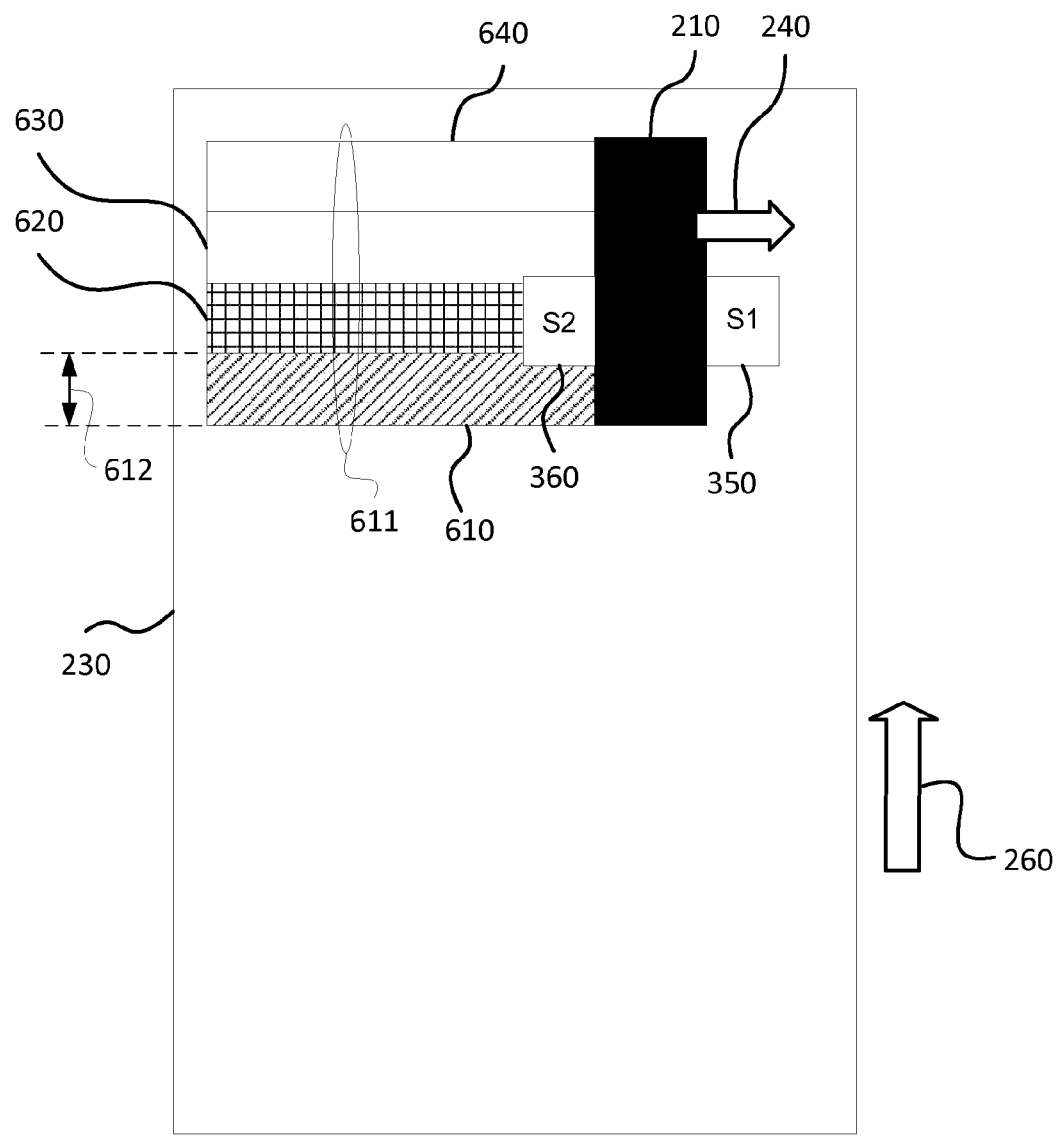
FIG. 6 illustrates the printing process of one overprint.

Each swath 2203 is composed, as depicted by a magnified version 2204 of a portion 2215 of the swath 2203, of four (in the present example) swath sections 2205-2208 (see 610 in FIG. 6). Each swath section such as 2208 is printed by a corresponding print head section such as 330.

Figure 8A:
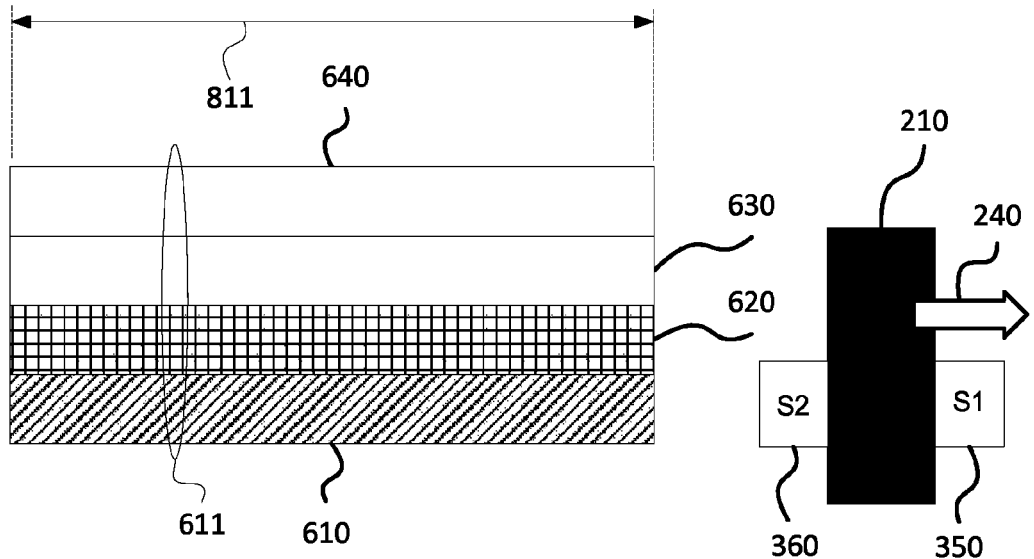
FIGS. 8A, 8B and 8C illustrate the relative positions of the overprints and the print head after a linefeed.
Figure 8B:
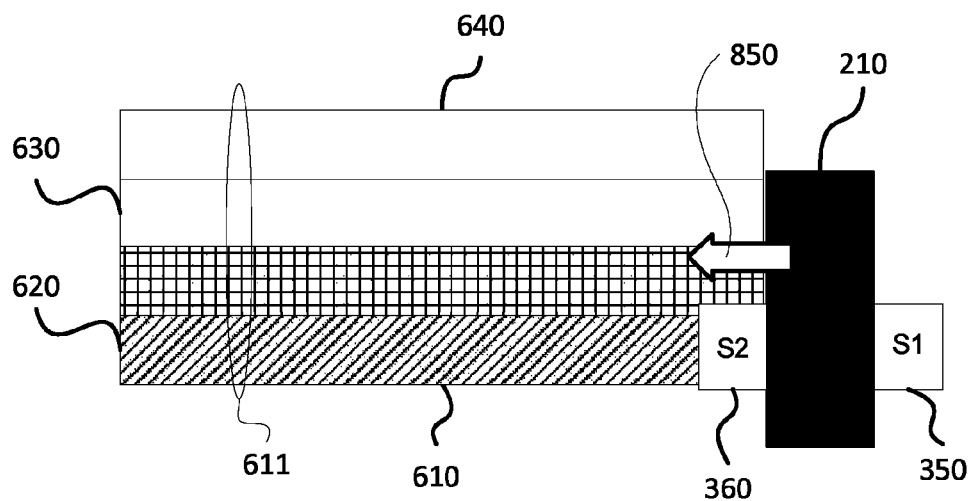
Figure 8C:
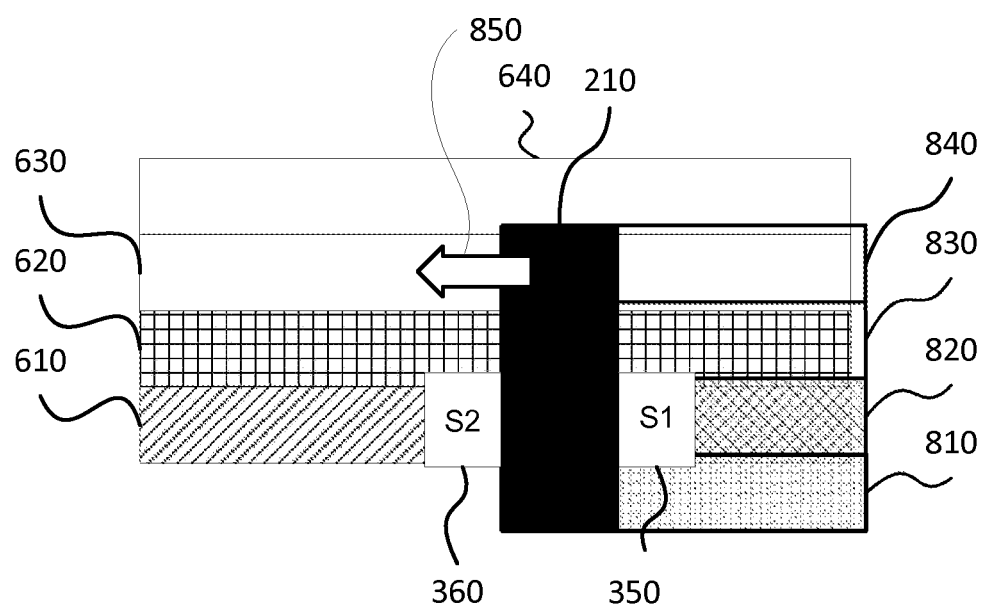

The process 400 prints each swath, and then, after displacing the print head by a line feed distance, which is roughly the width 322 of the print head section 330, overprints a printed swath with a subsequent swath which is displaced by the line feed distance as depicted in FIG. 8C, so that the first printed swath and the subsequently overprinted swath at least partially overlap or are overlayed. As described hereinafter in more detail with reference to FIG. 9, the aforementioned first printed swath can be used, prior to the subsequent overprinting pass, as a real-time transitory test chart which can be used, for example, to determine line feed error.

As described hereinafter in more detail in regard to FIGS. 5, 7 and 15, interleaved dot patterns (also referred to as marks or mark patterns) such as 2211 (see 541 in FIG. 5 and FIG. 15) and 2212 (see 542 in FIG. 5 and FIG. 15) are used, in the present example, to print first and second printing passes for each individual swath section such as 2208. This interleaving creates non-uniformly distributed oriented dot patterns as described hereinafter in more detail in regard to FIG. 15.

As depicted in a magnified version 2210 of a portion 2209 of the swath section 2208, an interleaved dot pattern 2211 is used to print the portion 2209 of the swath section 2208 during a first pass. A height 2213 of the interleaved dot pattern 2211 is, in the present example, the same height as a height 2214 of the swath section 2208. An interleaved dot pattern 2212, having dot patterns such as 2216 which are out of phase with dot patterns such as 2217 used for the first pass, is used to overprint the portion 2209 of the swath section 2208 during a second pass in a direction opposite to the direction used for the first pass. As described hereinafter in more detail with reference to FIG. 5, third and fourth printing passes do not use interleaved dot patterns.

Returning to FIG. 4, a step 410, described hereinafter in more detail in regard to FIG. 5, receives, via a file stored on the portable storage medium 125 which is read by the portable memory interface 106, or via a file received over the network 120, a reference image which is to be printed on a print medium 230, and constructs, using the processor 105 directed by the application program 133, a halftoned swath image, which is printed, using the print engine 110 directed by the processor 105 directed by the application program 133, in a subsequent step 420. As described hereinafter in more detail, a partly printed swath produced by the step 410 is depicted in FIG. 6. The lowest section 610 of the four-section swath image 611 depicted in FIG. 6 is then overprinted three times as the print head traverses, firstly to the left as depicted in FIG. 8B after one line feed increment, then to the right after a further line feed increment, and finally to the left after a further line feed increment.

FIG. 6 depicts an example of a printing process where the print head 210 moves in the direction 240. In FIG. 6, the print medium is associated with the reference numeral 230. The print head 210 and the two sensors 370 and 380 are shown in the middle of a current swath 611. A reference numeral 610 depicts a part of a printed image that is printed by the first quarter 330 of the nozzle bank 310 (ie the first section of the nozzle bank 310). A reference numeral 620 depicts a part of the printed image that is printed by the second quarter 340 of the nozzle bank 310 (ie the second section of the nozzle bank 310), and so on.

Referring back to FIG. 4, in a following step 440, the advance mechanism 250 transports the print medium 230 in the direction of the arrow 260 by one linefeed distance D. The design line feed distance $D^d$ in this example is specified to be approximately equal to the section size 322. The step 440 thus re-positions the print medium 230 so that thereafter, the current positions of the previously printed swath 611 and the print head 210 are depicted in FIG. 8A. Note the change in the vertical position of the print head relative to the position in FIG. 6.

Referring back to FIG. 4, a following step 450 determines the actual linefeed distance LF, described hereinafter in more detail in regard to FIG. 9. The step 450 can be performed either by using information from the sensor 370 or by using information from the sensor 380. The step 450 can be performed as long as the sensor 370 and/or the sensor 380 are able to capture image(s) of the printed first swath.

Figure 9:
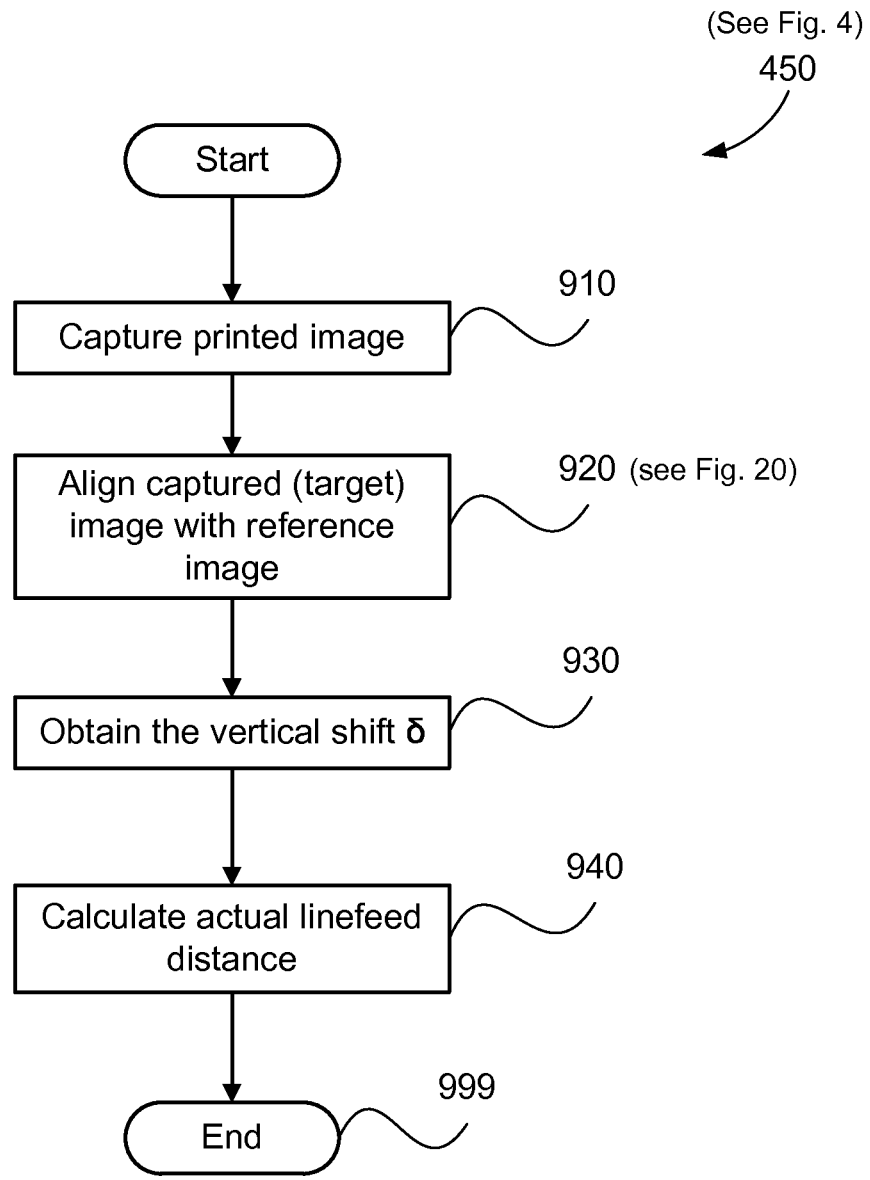
FIG. 9 shows a simplified flow diagram of the process where the vertical shift δ is determined.

FIG. 9 is a flow chart of a process, described hereinafter in more detail in regard to FIGS. 6, 10 and 20, for determining the actual linefeed distance LF. When the print head 210 reaches the edge of the printing area (ie the edge of the print medium 230) as shown in FIG. 8B, the sensor S2 can start capturing images that represent parts of the previously printed swath 611, as described in a step 910.

As an inkjet printer prints, the printer generally has information about the dot pattern to be printed at each swath, which means that it is known which nozzles print a dot and which nozzles are idle. Consequently, a reference image for the just-printed swath can be constructed. A reference image is information about the locations of the dots that are to be printed.

Figure 20:
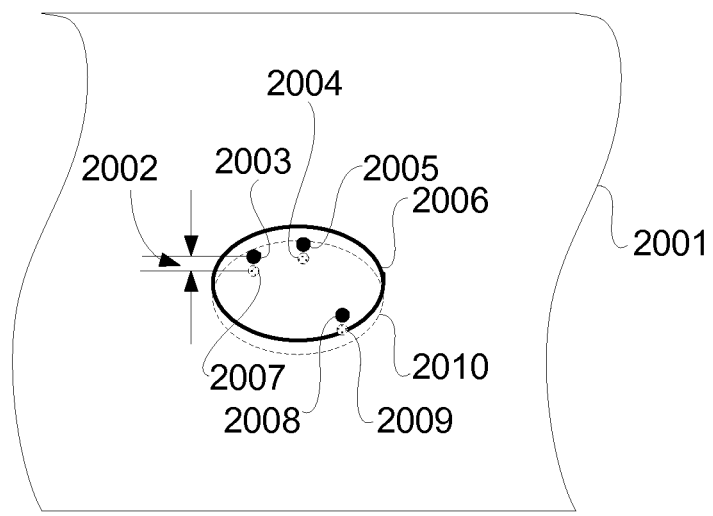
FIG. 20 illustrates how comparison between a reference image and a captured target image can yield a relative displacement measurement.

FIG. 20 depicts a swath 2001 and a region 2006 of a reference image to be printed on the print medium 230. The reference region 2006 contains three dots 2003, 2005 and 2008 to be printed. The print head 210 prints, in accordance with the aforementioned reference information, a swath on the print medium 230. A region 2010 of the printed swath on the print medium 230 contains three dots 2007, 2004 and 2009 corresponding to the reference dots 2003, 2005 and 2008. The region 2010 is captured as a target image by one of the print head sensors 370, 380. A vertical shift 2002 is evident between the reference image region 2006 and the captured target image region 2010.

Returning to FIG. 6, once the reference image is constructed, a vertical shift (displacement) δ between an image of the first quarter 610 of the swath 611 (referred to as a "target image") captured by the sensor S2, and the corresponding reference image, can be determined by aligning the reference image and the target image, as depicted in following steps 920 and 930. The alignment can be performed in the Fourier domain by convolving the target image and the reference image.

FIG. 10 shows an example of a reference image 1010 associated with the area covered by the sensor S2, and the target image 1020 captured by the sensor S2. By aligning the reference image 1010 and the target image 1020 as depicted in FIG. 10, a 2-D shift (ie 2-dimensional displacement) between the reference image and the target image can be determined Assuming that only the vertical displacement of the print head is of interest, that is the displacement representing the actual linefeed distance LF, then the relationship between the actual linefeed distance LF and the vertical shift δ between the reference image 1010 and the target image 1020 can be determined.

Assuming that δr, which is a parameter corresponding to the vertical shift between the reference image 1010 and the target image 1020 for the case of no linefeed error, is known, linefeed error can be calculated as the difference between δ and δr.

Referring back to FIG. 4, a following step 470 determines if the printing of the page is finished. If this is not the case, the process 400 returns to the step 410 that constructs the next swath, comprising four swath sections, using information about the calculated (actual) linefeed distance LF, followed by printing the constructed next swath as depicted in FIG. 8C.

FIG. 8C also shows a second quarter 820 of a swath that is printed on top of the first quarter 610 of the previous swath. Similarly, the same area 610 is subsequently further overprinted by a third quarter of a following swath and a fourth quarter of a further following swath. In other words, the final appearance of the printed area is constructed by 4 successive print passes.

Referring back to FIG. 4, in the step 410, according to the present example of the PORSM arrangement, the first quarter 610 of the swath is constructed to be an "oriented pattern". This is a pseudo-random pattern with an "orientation" which, in this instance, is substantially in a direction 263 perpendicular to the linefeed. More specifically, the pattern has longer inter-dot distances between dots in the direction 262 of the linefeed (ie in the "vertical" direction) relative to the inter-dot distances in the direction perpendicular to the linefeed (ie in the "horizontal" direction). This is described hereinafter in more detail with reference to FIG. 16.

As is described hereinafter in more detail in regard to FIG. 15, the second quarter 820 of the swath that is printed on top of the first quarter 610 of the previous swath is, in one PORSM arrangement, constructed to be of the opposite phase relative to the phase of the pattern of 610, so as to compensate for the oriented pattern used for 610. The subsequent two overprints on top of 610 are not oriented dot patterns, thus the overprinting can further reduce the visibility of the oriented pattern used for 610. Other combinations of different phases and/or non-oriented overprints can also be used to neutralise the oriented dot patterns of 610.

In this manner, the oriented pattern used for 610 can, for example, be used to enable accurate line feed measurement by the step 450 in FIG. 2. Thereafter, the subsequent three (in the present example) overprints compensate for and negate the effects of the oriented pattern used for 610 so that the final image effectively exhibits no orientated dot patterns. This enables the oriented dot patterns to be used, for example, for real-time line feed measurement while the image is printed, while the oriented dot patterns are effectively neutralized, from a visibility perspective, in the final image.

Figure 21:
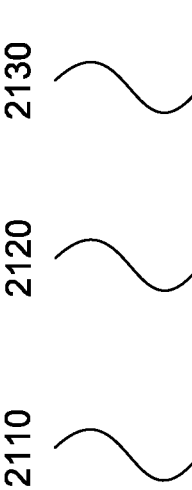
FIG. 21 is a table (referred to as Table 1) that presents horizontal and vertical dot distances of oriented dot patterns in terms of corresponding uniform dot patterns.

FIG. 21 presents, in the form of a table referred to as Table 1, horizontal and vertical dot distances of oriented dot patterns in terms of corresponding uniform dot patterns. Table 1 shows that a "4%-density" dot pattern 2110 has a horizontal dot distance corresponding to that of an "8%-density" uniform dot pattern 2120, and a vertical dot distance corresponding to that of a "2%-density" uniform dot pattern 2130. The term "N %-density" can be defined, in one PORSM example, as firing rate, which results in N dots being printed per 100 pixels.

In general, if images are to be aligned using dot patterns, reasonable inter-dot distances should be maintained. If, for example, inter-dot distances are too small, dots can interfere with other dots due to optical dot gain and/or limited resolution of an imaging device. If on the other hand inter-dot distance is too large, then the image has a relatively small number of dots and such an image cannot provide sufficient gradient energy for image alignment. Here, horizontal gradient energy can be defined as sum of horizontal differential of the image I; $\Sigma I_x = \Sigma \partial / \partial x$ and vertical gradient energy can be defined as sum of vertical differential of the image I: $\Sigma I_y = \Sigma \partial I / \partial y$. Therefore, although the PORSM arrangements utilise oriented pseudo-random patterns of dots to obtain improved results for linefeed measurements, reasonable vertical inter-dot distances need to be maintained. 4%-density dot patterns as depicted in Table 1 have been found to give good results.

The oriented patterns used in the swaths of the PORSM arrangements can provide good accuracy for linefeed measurement, because such patterns have large gradient energy in the direction of the linefeed (ie in the vertical direction 263) while maintaining a reasonable dot distance in the direction perpendicular to the direction of the linefeed (ie in the horizontal direction 262). The oriented patterns can cause dot interferences in the perpendicular direction of the linefeed due to optical dot gain and/or low resolution capturing. However this horizontal interference has only a small impact on the accuracy of the vertical shift estimation. Therefore, the alignment step 920 gives the vertical shift δ very accurately.

Moreover, at least one of the second, third, or fourth quarters of the swath 610 is constructed to have the same orientation as the first quarter of the swath 610 but with a different "phase" in order to compensate for negative effects caused by the use of the oriented patterns.

Figure 15:
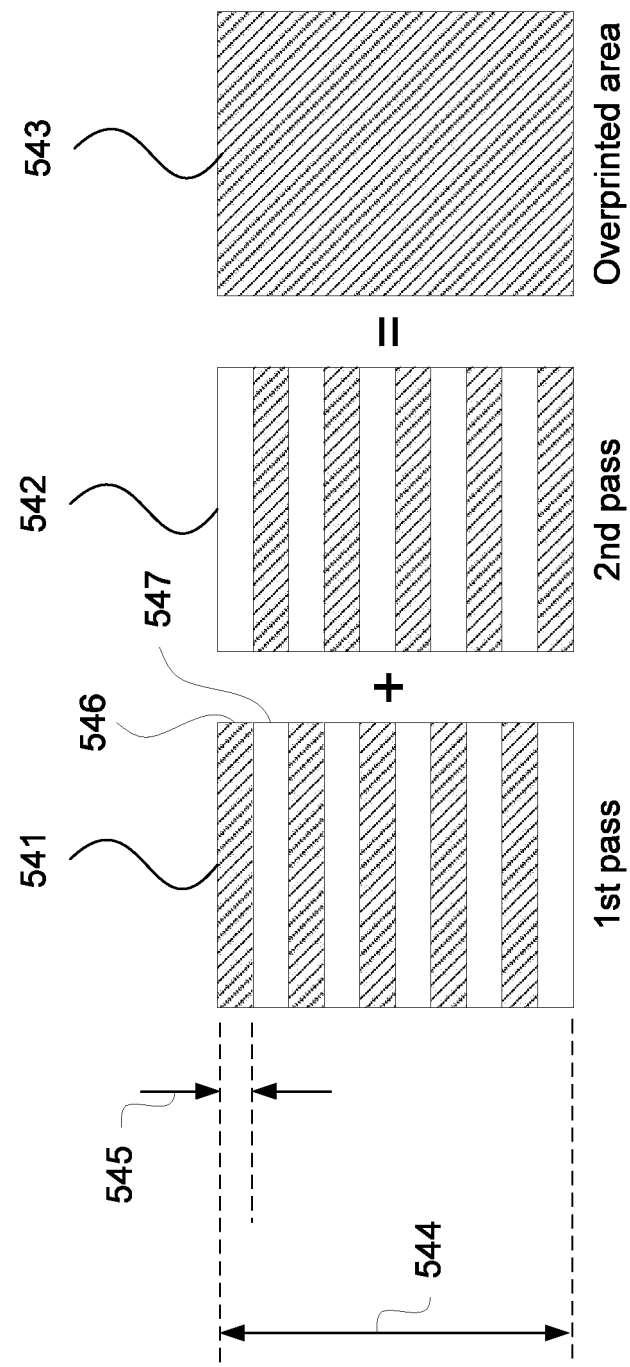
FIG. 15 illustrates phases of a 1st print pass, a 2nd print pass and an overprinted area in a first PORSM arrangement.

FIG. 15 shows one example of oriented dot patterns for a swath. A first pattern 541 is used for a first pass, and a second pattern 542 having opposite phase to the first pattern 541 is used for a second pass of a four-pass sequence. The term "phase" in this example means that the oriented pattern 541 has dots on only odd bands such as 546 while the oriented pattern 542 has dots, having the same orientation, on only even bands such as 547. The bands 546, 547, running in a direction perpendicular to the line feed direction, are the same width, and may be as narrow as the distance 323 between the print head nozzles 324, 325. The distance 323 is typically approximately equal to the width of a single row of printed dots. Alternately the bands may be wider than this, and may be as wide as multiples of the distance 323 between the print head nozzles 324, 325, provided that the compensation of the dot oriented patterns is effectively achieved. In other words, the bands may assume a width lying between the width of a single row of printed dots and the width of a plurality of rows of printed dots In this way, as previously described the orientation of the pattern of the first quarter 610 is substantially negated so that a final print-out does not have noticeable orientation as a final printed pattern 543.

Another key function of the step 410 is calibration of the linefeed measured at the step 450, which will be described in detail later.

Referring back to FIG. 4, at the step 470, if the printing of the page is finished, the process 400 ends at a step 499. In this manner the printer prints successive next swaths as long as the end of the page is not reached. This calibration and printing process continues for each swath until the print head reaches the end of the page as determined by the step 470.

[First PORSM Arrangement]

The first PORSM arrangement is designed to measure and calibrate the linefeed distance of a printer in real time.

Referring back to FIG. 4, the first step 410, described hereinafter in more detail in regard to FIG. 5, constructs a halftoned swath image.

Figure 5:
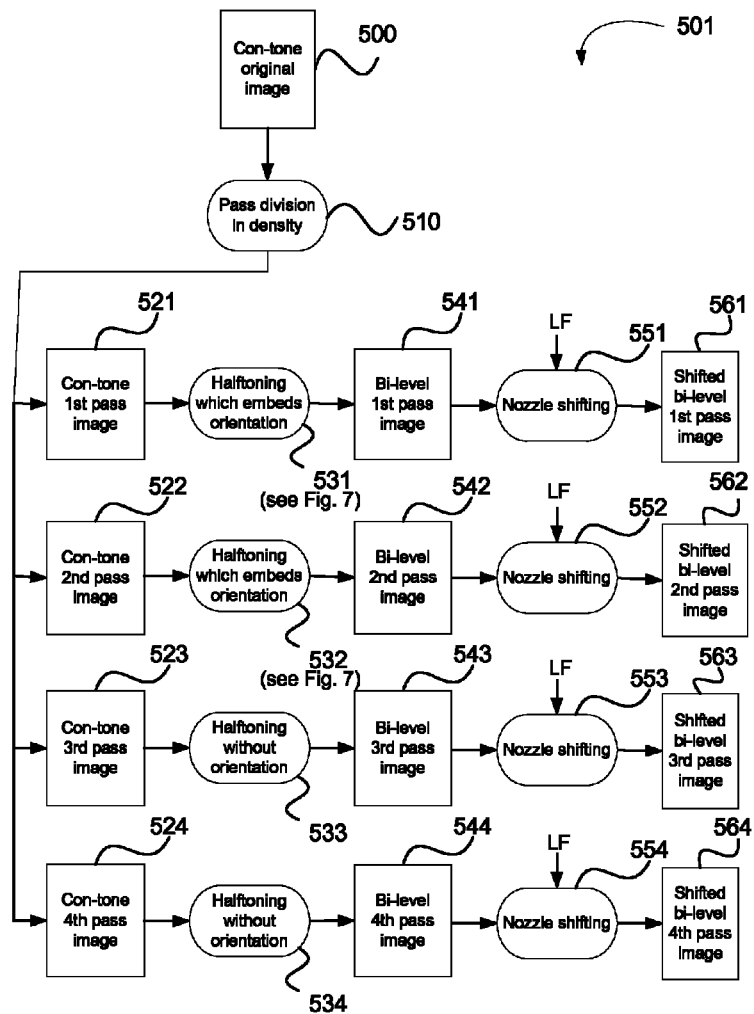
FIG. 5 shows a general flow diagram of the swath construction process in a first PORSM arrangement.

FIG. 5 shows an example of a process 501 for implementing the step 410. The process 501 is performed when appropriate, and produces $1^{st}$, $2^{nd}$, $3^{rd}$ and $4^{th}$ pass swath section images each time the process is performed. An example of a $1^{st}$ pass swath section is depicted at 541 in FIG. 15.

Firstly, an original continuous-tone image 500 (also referred to as a "con-tone" image) of the swath in question is divided into, in this example, 4 printing passes by a step 510.

The step 510 is performed in a continuous-tone domain, and therefore the divided passes 521, 522, 523 and 524 are continuous-tone as well.

In the present example as described hereinafter in more detail in regard to FIG. 7, a step 531 and a step 532 apply halftoning that embeds orientation in a direction perpendicular to the linefeed, where the step 531 and the step 532 use opposite phases with each other. The use of opposite phases allows the sum of the generated images 541 and 542 to have no noticeable orientation.

Figure 7:
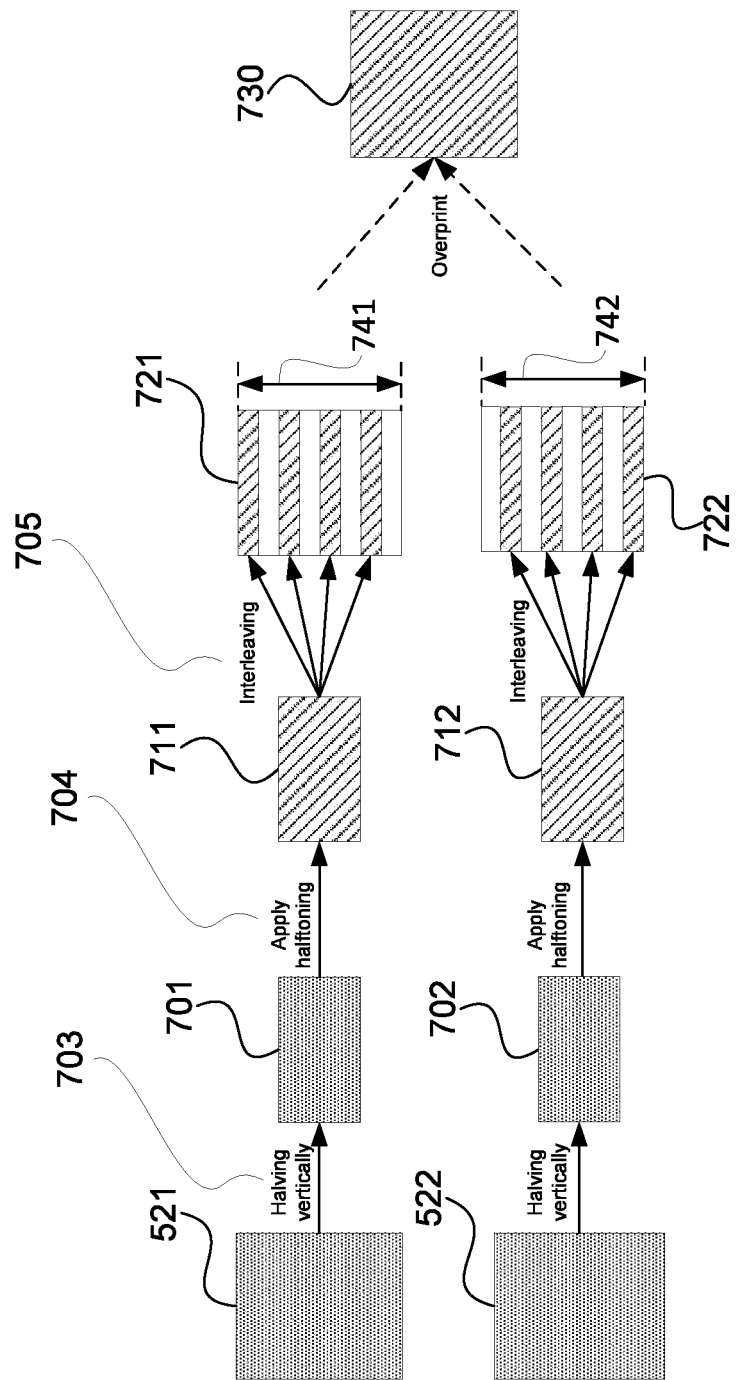
FIG. 7 shows a general flow diagram of halftoning which embeds an orientation process in a first PORSM arrangement.

FIG. 7 shows one example implementation of the step 531 and 532. At first, the input images 521 and 522, which are swath section size regions of the reference image which are to be printed, are partitioned so that they are halved vertically into respective half-regions 701, 702 by for example interpolation. Accordingly, the half-region 701 may be the top half, or the bottom half, or some other piece of the same size, from the respective input image 521. Then the half-regions are halftoned. Here the halftoning itself has no orientation, and therefore the halftoned images 711 and 712 have uniform pseudo-noise dot distribution. The halftoning method can be based upon common algorithms such as blue noise masking or error diffusion. After halftoning, interleaving with blank rows is applied to the halftoned images 711 and 712. This has the effect of doubling the image height, so that height 741 and 742 of the interleaved images 721 and 722 correspond to the print head section size 322. When interleaving, the generated images 721 and 722 are made to have opposite phases (shifted phase by 1 row) with each other. Consequently, the image 721 has dots only on odd rows while the image 722 has dots only on even rows, so that overprinting the image 721 and the image 722 results in no noticeable orientation as an image 730.

Figure 16:
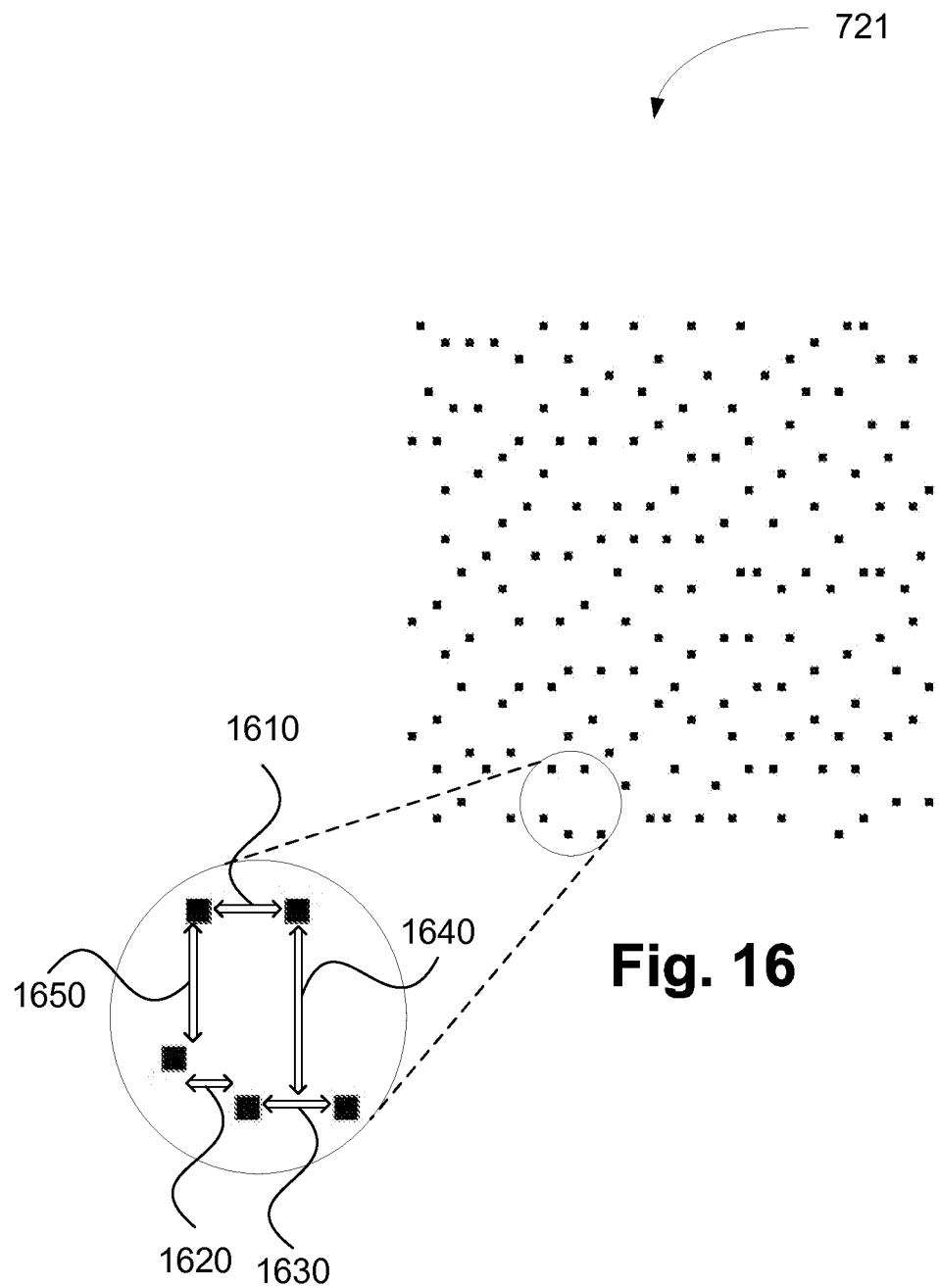
FIG. 16 shows an example tile in a first PORSM arrangement and its zoom.

FIG. 16 shows an example of the output pattern 721 generated in this manner and its zoom. Please note horizontal (ie considering the direction depicted by the vector arrow 262 in FIG. 2) dot distances 1610, 1620 and 1630 between nearest neighbours are typically shorter than vertical (ie considering the direction depicted by the arrow 263 in FIG. 2) dot distances 1640 and 1650 between nearest neighbours. In other words, when vectors from each dot to the nearest neighbouring dot are defined, their arguments (ie the angles defining the directions of the vectors) are not uniform but are statistically biased toward the horizontal direction (ie vectors are oriented). It should be noted that all the vectors do not have to have arguments which are close to the horizontal direction (as depicted in FIG. 16 for example).

Figure 23:
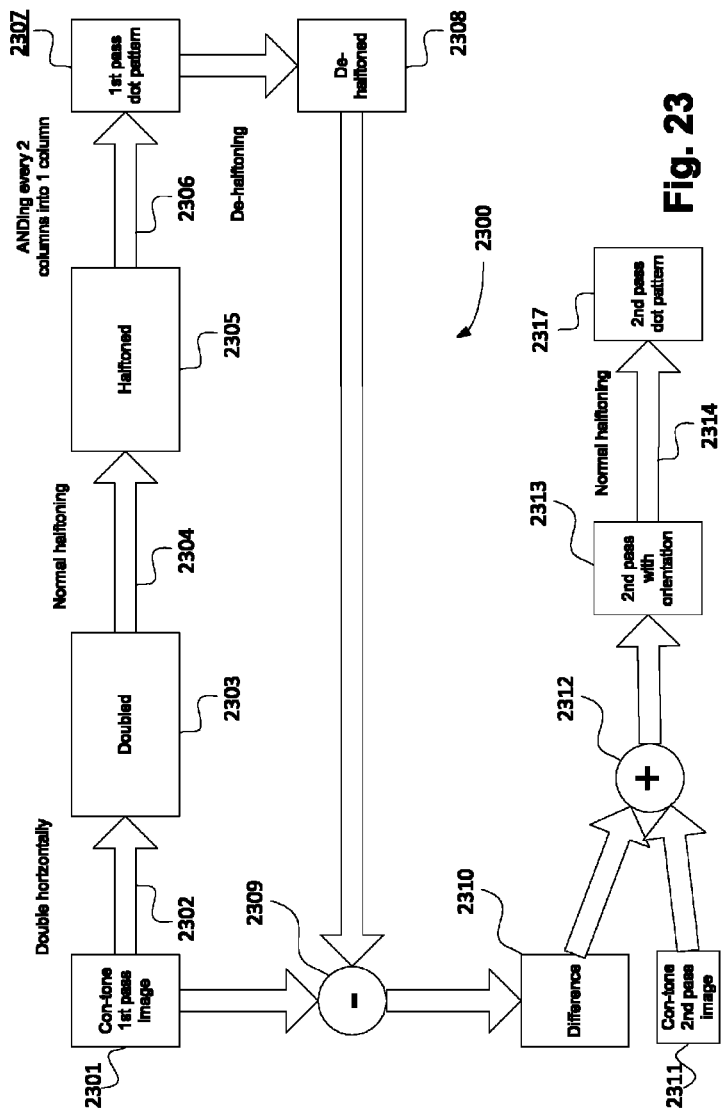
FIG. 23 shows another method for producing oriented dot patterns for use with PORSM arrangements.

FIG. 23 shows another method for producing oriented dot patterns for use with PORSM arrangements. A con-tone original 1st pass image 2301 is firstly doubled horizontally and secondly halftoned. Then the halftoned image 2305 is halved horizontally by for example logically ANDing 2 consecutive columns (ie a consecutive pair of columns) into 1 column to obtain 1st pass dot pattern 2307. The 1st pass dot pattern 2307 is then de-halftoned by for example low pass filtering. The de-halftoned image 2308 is subtracted from the original image 2301. The difference image 2310 represents opposite phase with the 1st pass dot pattern 2307. The subtraction of de-halftoned image will be described in detail hereinafter. By adding the difference image 2310 to a con-tone original 2nd pass image 2311, a 2nd pass with orientation can be obtained. By halftoning the image 2313, a 2nd pass dot pattern 2317 which has same orientation as the 1st pass 2308 but with opposite phase is constructed.

Referring back to FIG. 7, since the dot patterns 711 and 712 have similar dot distance in the horizontal and the vertical direction, doubling the image height generates a pattern with a vertical dot distance approximately twice the length of its horizontal dot distance. This oriented pattern 721 can provide good accuracy for the image alignment 920 step in the direction 260 of linefeed. Moreover, the pattern 721 does not cause visual artefacts in the final print-out because it will be negated by the subsequent print pass 722.

Referring back to FIG. 5, steps 533 and 534 perform normal halftoning, which does not introduce orientation of dot patterns. Therefore, the sum of the all passes 541, 542, 543 and 544 has little if any resultant dot pattern orientation because the orientation of the 1st pass 541 is substantially negated (neutralized or compensated) by the out of phase 2nd pass 542. The subsequent 3rd and 4th passes can attenuate even further any residual orientation remaining after the first two passes.

The following steps 551, 552, 553 and 554 perform nozzle shifting according to the measured error of linefeed (from the step 450 in FIG. 4) to compensate the discrepancy between the actual linefeed distance LF and the designed linefeed distance $D^d$. For example, if the actual linefeed distance is approximately two pixels width longer than designed, the steps 551, 552, 553 and 554 shift the images 541, 542, 543 and 544 by two pixels upward respectively, resulting in dot pattern to be printed 561, 562, 563 and 564 are designed. Each dot pattern is then combined with different print passes of neighbouring regions to construct final swath data which has a height 321 equal to that of the print head.

It should be noted the orientation can be embedded in a number of different ways. An alternate implementation of this is horizontal doubling followed by halftoning without orientation and horizontal halving. Moreover, a dedicated blue noise mask can be used.

Figure 11A:
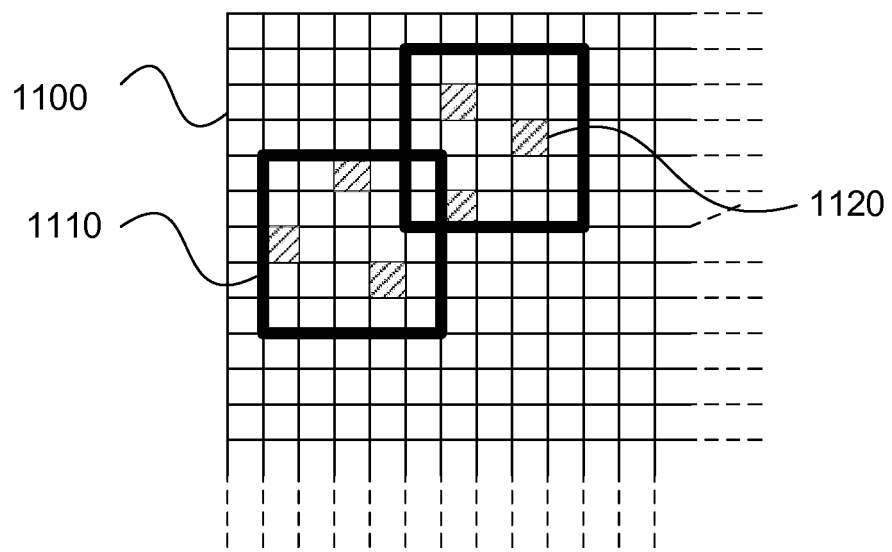
FIGS. 11A and 11B depict processes of designing conventional and oriented blue noise masks.

In general, as shown in FIG. 11A, a blue noise mask 1100 can be designed by limiting the number of values 1120 (ie by limiting the number of dots that are printed) which are less than an arbitrary number within an arbitrary square window 1110 of the halftoning matrix.

Figure 11B:
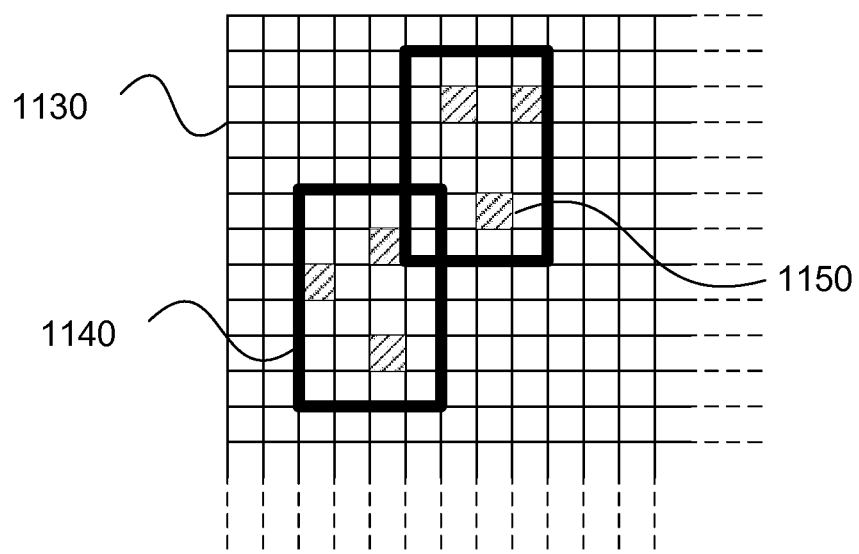

As shown in FIG. 11B, instead of using the square window 1110, using a vertically longer rectangular window 1140 allows design of an oriented blue noise mask 1130, which generates a pattern which has longer vertical dot distances than horizontal dot distances. Use of the dedicated blue noise mask removes the requirement for halving or doubling (as depicted in FIG. 7 for example) anymore because the matrix itself contains the orientation. A 2nd pass can be constructed in same way as FIG. 15. Subtraction of de-halftoned 1st pass can embed opposite phase to the 2nd pass.

It should be noted that not only the 2nd pass, but also all passes apart from the 1st pass can be used for negating the orientation of the dot patterns of the 1st pass. For example, the phase of three passes may be adjusted to together counter the orientation of the 1st pass. As long as (i) the 1st print pass produces a horizontal orientation, and (ii) the sum of all print passes does not have an orientation, any suitable patterns can be used.

[Second PORSM Arrangement]

The second PORSM arrangement is designed to measure and calibrate the linefeed distance of a printer in real time.

Figure 12:
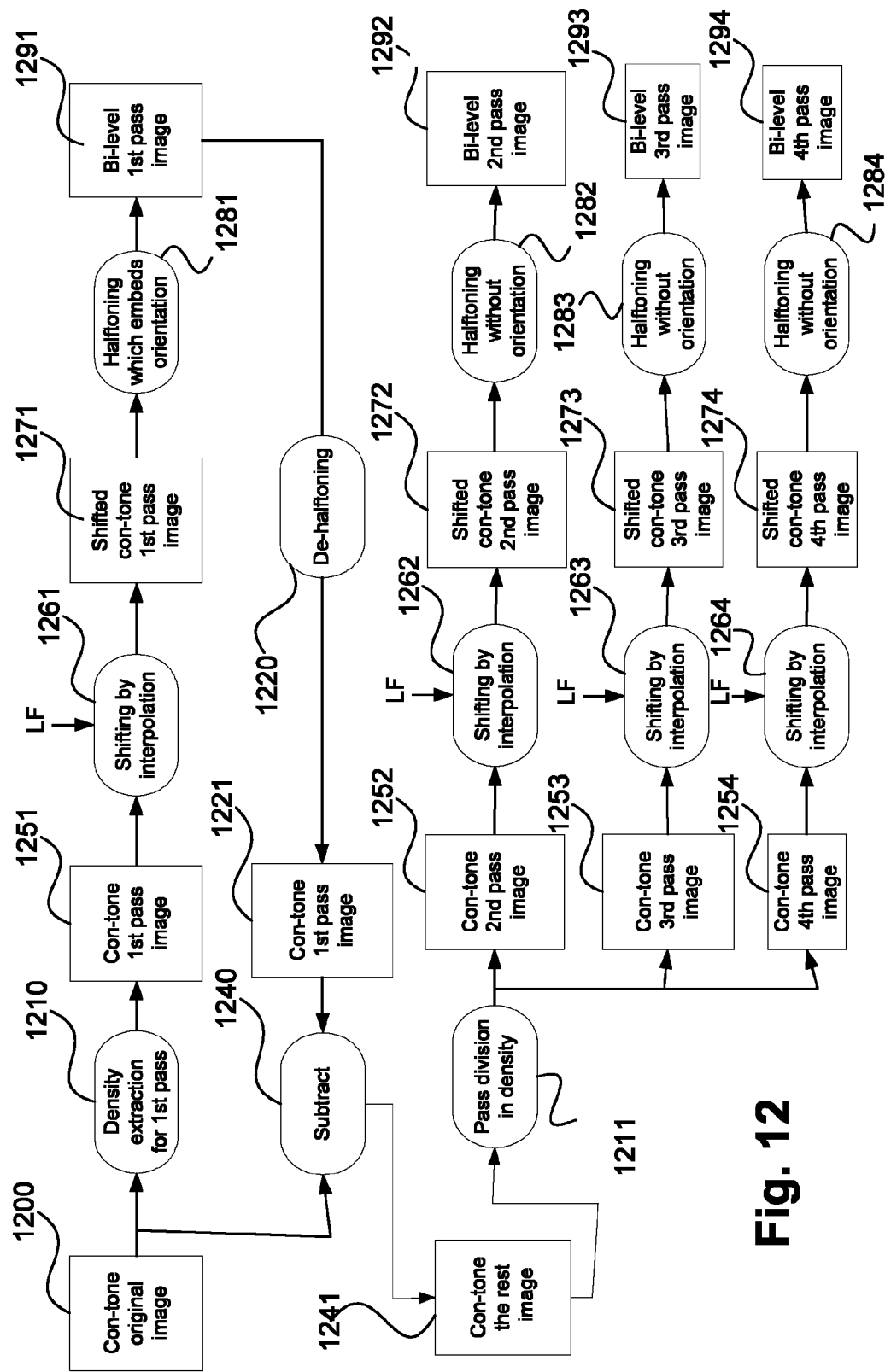
FIG. 12 shows a general flow diagram of the swath construction process in a second PORSM arrangement.

FIG. 12 shows another implementation of the swath-construction step 410. A first step 1210 extracts a certain portion of the density of the image to be printed for the 1st pass from the input original image 1200 to produce a partial density con-tone 1st pass image 1251. This can be done, for example, by extracting 25% of the original density. Then a step 1261 compensates for measured linefeed error by appropriately shifting the 1st pass image 1251 to produce a shifted con-tone image 1271. The shifting is carried out in the continuous-tone domain by using interpolation, unlike the first arrangement which performs shifting in the halftoned dot domain.

In a following step 1281, the shifted image 1271 is halftoned, so that horizontal dot pattern orientation is embedded in a similar manner as the first arrangement depicted in FIG. 5 to produce a bi-level 1st pass image 1291. In this manner, the final image 1291 for the 1st pass is constructed. By using the halftoned image 1291, which has an orientation in a direction perpendicular to the linefeed, as the target image and the appropriate reference image, at the step 920 in FIG. 9, the vertical shift 8 can be measured accurately.

A step 1220 applies de-halftoning to the halftoned image 1291 to obtain a corresponding continuous-tone image 1221. This process can be done, for example, using a low-pass filtering process. Then a step 1240 subtracts the de-halftoned image 1221 from the original image 1200. Since the de-halftoned image 1221 has same orientation as the halftoned image 1291, a difference image 1241 has same orientation as the halftoned image 1291 but with opposite phase.

FIGS. 13A, 13B, 13C, 13D and 13E depict outputs at various stages of the process in FIG. 12 so far. These figures show profiles of the images, where X axes correspond to the direction 260 of linefeed, and Y axes depict density of the images.

Figure 13A:
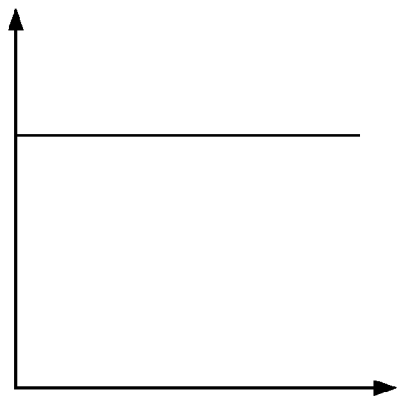
FIGS. 13A, 13B, 13C, 13D and 13E show profiles of the images in FIG. 12.
Figure 13B:
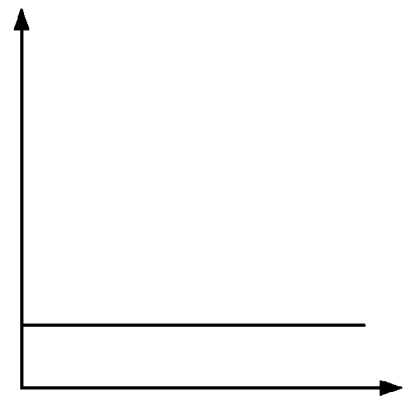
Figure 13C:
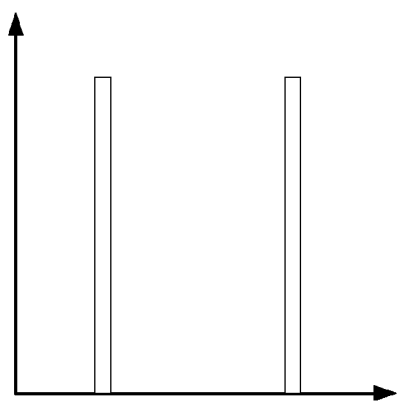
Figure 13D:
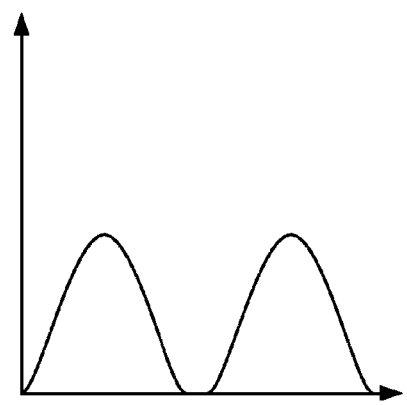
Figure 13E:
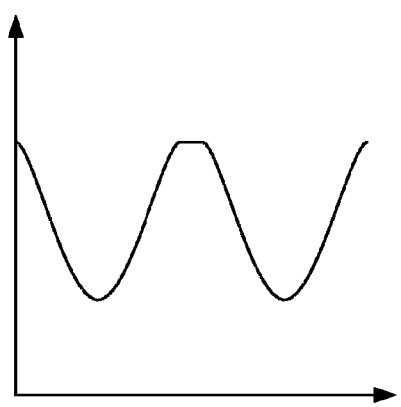

FIG. 13A shows a profile of the original continuous-tone image 1220. FIG. 13B shows a profile of the extracted 1st pass image 1251. FIG. 13C shows a profile of the halftoned (bi-level) image 1291. FIG. 13D shows a profile of the de-halftoned image 1221. FIG. 13E shows a profile of the difference image 1241. As shown in these figures, the halftoned image 1291 has same phase as the de-halftoned image 1221 and opposite phase as the difference image 1241.

Referring back to FIG. 12, a following step 1211 divides the difference image 1241 into later passes 1252, 1253 and 1254 (for the 2nd, 3rd and 4th passes respectively) in the continuous-tone domain. This can be done by equally dividing the density (i.e. division by 3). Then steps 1262, 1263 and 1264 shift the images 1252, 1253 and 1254 by the amount of measured linefeed error respectively. Following steps 1282, 1283 and 1284 perform halftoning to obtain halftoned bi-level images 1292, 1293 and 1294. Since the difference image 1241 has oriented dot patterns, all of the following images have same orientation so that the final print-out, which is a superposition of the halftoned image 1291, and the opposite-phase images 1292, 1293 and 1294, has little if any visible orientation. Moreover, since the linefeed error of each print pass is corrected by the shifting 1261, 1262, 1263 and 1264, the final print-out has reduced artefacts due to linefeed error.

[Third PORSM Arrangement]

The third PORSM arrangement is designed to measure and calibrate the linefeed distance of a printer offline.

Figure 14:
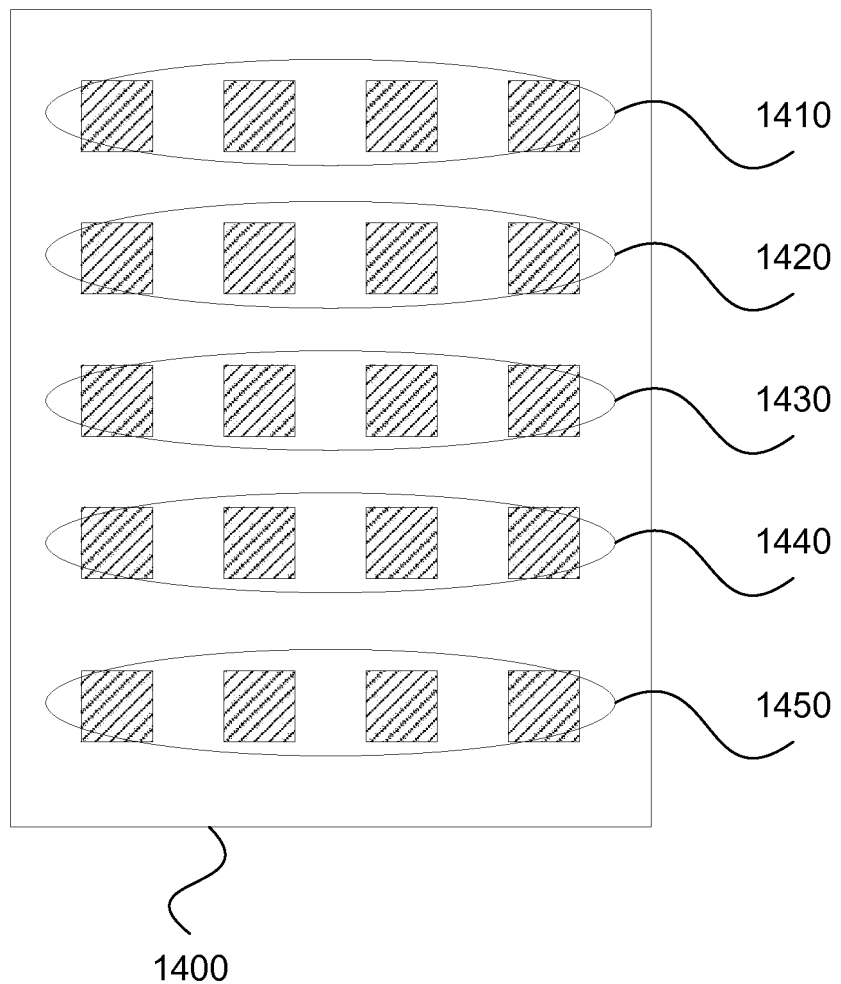
FIG. 14 shows a layout of a test chart in a third PORSM arrangement.

FIG. 14 shows a test chart 1400 which is used in this arrangement. A group 1410 of tiles is printed as the 1st swath. Each tile within the group 1410 is designed to have horizontal orientation, similar to the 1st print pass of the previous arrangements. After linefeed is performed, a second group 1420 of tiles is printed as the second swath. In a similar fashion, a third group of tiles 1430 is printed after printing the second group 1420 and performing a linefeed, and so on. Every tile within the chart 1400 is designed to have horizontal orientation.

The printed chart is then scanned by a flat-bed scanner. By correlating the scanned image with corresponding digital tiles, locations of each tile can be found. In this way, the amount of linefeed can be measured as the distance between the tiles and this measured linefeed distance is used to calibrate the printer for further printing. Since the tiles have a pattern with a horizontal orientation, the correlation provides accurate measurement in the vertical direction, ie the direction of linefeed.

INDUSTRIAL APPLICABILITY

The arrangements described are applicable to the computer and data processing industries and particularly for the printing and reproduction industries.

The foregoing describes only some embodiments of the present invention, and modifications and/or changes can be made thereto without departing from the scope and spirit of the invention, the embodiments being illustrative and not restrictive.

The invention claimed is:

1. A method of determining line feed error in an image forming apparatus for printing a reference image on a print medium, said image forming apparatus comprising a print head having a head sensor configured to sense information from images printed on the print medium, said method comprising the steps of:
    printing a first swath of a halftone image of the reference image on the print medium, said first swath having a dot pattern oriented in a direction perpendicular to a direction of linefeed of the image forming apparatus;
    repositioning the print head relative to the print medium by at least one line feed distance;
    determining a line feed error based upon information sensed by the head sensor from the printed first swath; and
    printing, using the determined line feed error, a second swath of the halftone image of the reference image on the print medium, wherein said second swath:
        (i) at least partially overlaps the first swath; and
        (ii) has a dot pattern configured to at least partly neutralise, in an overlap area of the first swath and the second swath, the orientation of the first swath dot pattern in the halftone image.

2. A method according to claim 1, wherein the oriented dot pattern of the first swath exhibits inter-dot distances between dots in a linefeed direction that are longer than inter-dot distances between dots in a direction perpendicular to the linefeed direction.

3. A method according to claim 2, wherein the step of printing the first swath of the halftone image of the reference image comprises the steps of:
    partitioning, in the linefeed direction, a region of the reference image corresponding to a size of the first swath into a first half-region and a second half-region;
    applying halftoning to the first half-region;
    interleaving blank bands, running in a direction perpendicular to the linefeed direction, between halftoned bands of the halftoned first half-region to thereby double a vertical size of the halftoned first half-region and construct the first swath having even blank bands and odd halftoned bands; and wherein the step of printing the second swath of the halftone image of the reference image comprises the steps of:
    applying halftoning to the second half-region;
    interleaving blank bands, running in the direction perpendicular to the linefeed direction, between halftoned bands of the halftoned second half-region to thereby double a vertical size of the halftoned second half-region and construct the second swath having odd blank bands and even halftoned bands.

4. A method according to claim 3, wherein the halftoned bands may assume a width lying between a width of a single row of printed dots and a width of a plurality of rows of printed dots.

5. A method according to claim 2, wherein the step of printing the first swath of the halftone image of the reference image comprises the steps of:
    doubling, in a direction perpendicular to the linefeed direction, a region of the reference image corresponding to a size of the first swath;
    applying halftoning to the doubled region;
    applying a logical AND operation to consecutive pairs of halftoned bands running in the linefeed direction to thereby halve a horizontal size of the doubled region and construct the first swath.

6. A method according to claim 3, wherein:
    the halftoning uses a noise mask to generate a dot pattern which has longer vertical dot distances than horizontal dot distances.

7. A method of forming a halftone image on a print medium using a print head of an image forming apparatus, said method comprising the steps of:
    printing a first pattern of marks on the print medium in a first pass of the print head over the print medium, said first pattern of marks being oriented in a direction perpendicular to the direction of linefeed of the image forming apparatus, said first pattern of marks forming a transitory test chart prior to printing of a second pattern of marks being at least partially overlayed on the printed first pattern of marks and at least partly neutralising the orientation of the first pattern of marks; and
    printing the second pattern of marks on the print medium in a second pass of the print head over the print medium, said second pattern of marks being configured to be of opposite phase to and oriented in the same direction as the first pattern of marks, said second pattern of marks being at least partially overlayed on the printed first pattern of marks and at least partly neutralising the orientation of the first pattern of marks in the overlap area of the halftone image.

8. A method of constructing a test chart wherein each printing pass comprises a pseudo-noise pattern of dots; wherein in a first printing pass:
    vectors between each dot and the nearest neighbouring dot are orientated in a direction perpendicular to a line feed direction; and
    a density of the pattern of dots in a line feed direction is less than a density of the pattern of dots in a direction perpendicular to the line feed direction.

9. An image forming apparatus for printing a reference image on a print medium, said image forming apparatus comprising:
    a processor;
    a memory storing a computer executable program for directing the processor to execute a method for determining line feed error in the printed image; and
    a print head having a head sensor configured to sense information from images to printed on the print medium;
    the program comprising:
    computer executable code for printing a first swath of a halftone image of the reference image on the print medium, said first swath having a dot pattern oriented in a direction perpendicular to a direction of linefeed of the image forming apparatus;
    computer executable code for repositioning the print head relative to the print medium by at least one line feed distance;

computer executable code for determining a line feed error based upon information sensed by the head sensor from the printed first swath; and computer executable code for printing, using the determined line feed error, a second swath of the halftone image of the reference image on the print medium, wherein said second swath:

(i) at least partially overlaps the first swath; and (ii) has a dot pattern configured to at least partly neutralise, in an overlap area of the first swath and the second swath, the orientation of the first swath dot pattern in the halftone image.

10. A tangible computer readable non-transitory storage medium storing a computer executable program for directing a processor, in an image forming apparatus comprising a print head having a head sensor configured to sense information from images printed on a print medium, to execute a method for determining line feed error in an image printed by the image forming apparatus; the program comprising:

computer executable code for printing a first swath of a halftone image of the reference image on the print medium, said first swath having a dot pattern oriented in a direction perpendicular to a direction of linefeed of the image forming apparatus;

computer executable code for repositioning the print head relative to the print medium by at least one line feed distance;

computer executable code for determining a line feed error based upon information sensed by the head sensor from the printed first swath; and computer executable code for printing, using the determined line feed error, a second swath of the halftone image of the reference image on the print medium, wherein said second swath:

(i) at least partially overlaps the first swath; and (ii) has a dot pattern configured to at least partly neutralise, in an overlap area of the first swath and the second swath, the orientation of the first swath dot pattern in the halftone image.

\* \* \* \* \*